Jan. 14, 1936.  G. H. TAY  2,027,756
CENTER LINE SCRAPER AGITATOR
Filed Dec. 20, 1934  3 Sheets-Sheet 1

Inventor

George H. Tay

By Mason Fenwick & Lawrence
Attorneys

Jan. 14, 1936.   G. H. TAY   2,027,756
CENTER LINE SCRAPER AGITATOR
Filed Dec. 20, 1934   3 Sheets-Sheet 2
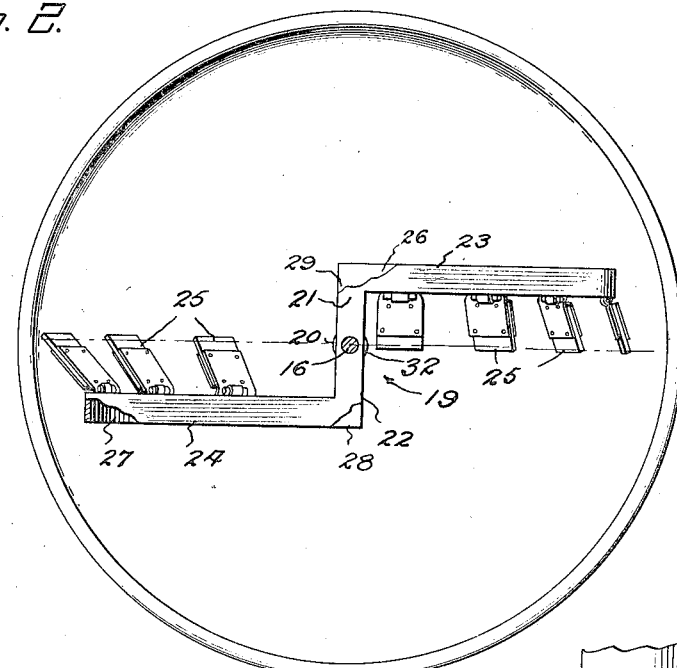
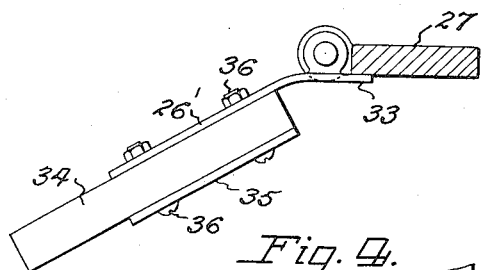
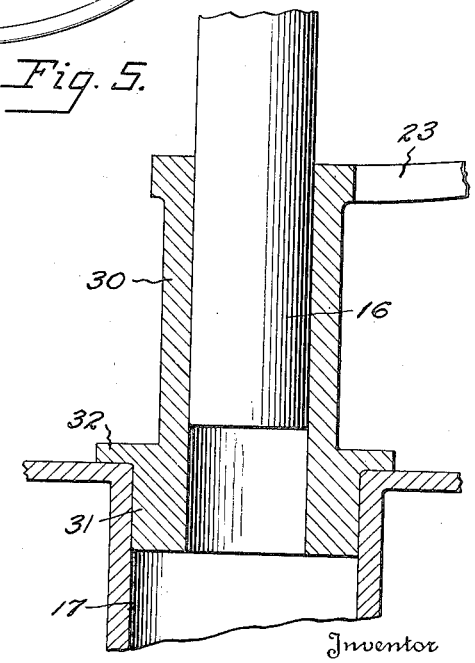
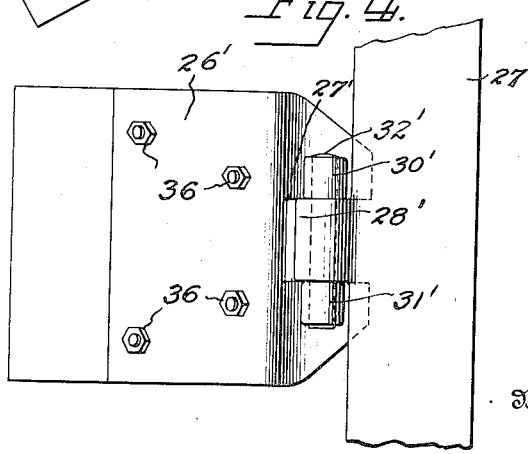
Inventor
George H. Tay
By Mason Fenwick Lawrence
Attorneys Jan. 14, 1936.                 G. H. TAY                    2,027,756
                     CENTER LINE SCRAPER AGITATOR
                       Filed Dec. 20, 1934        3 Sheets-Sheet 3
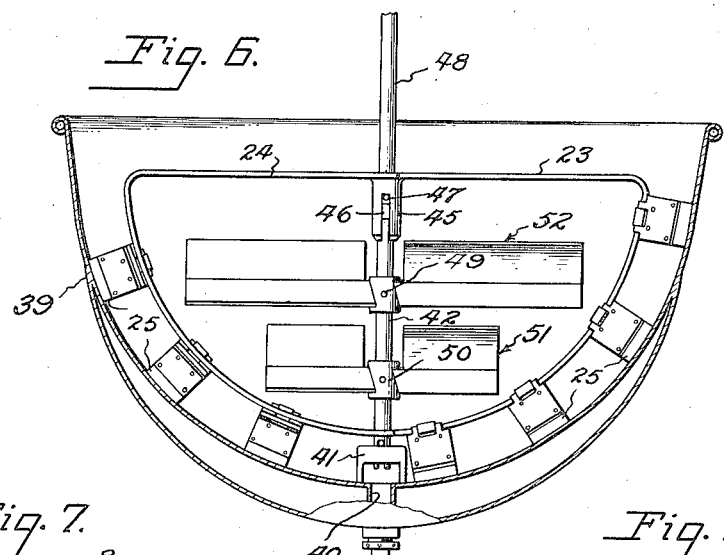
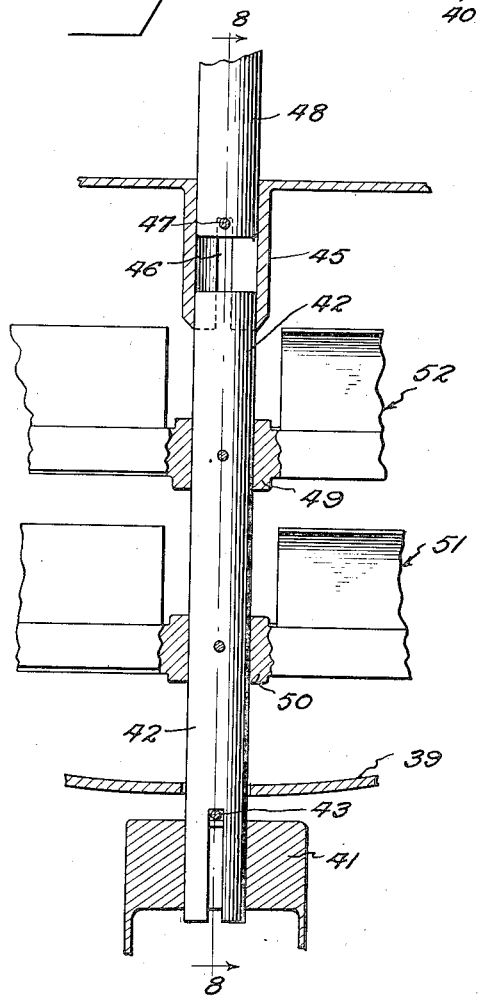
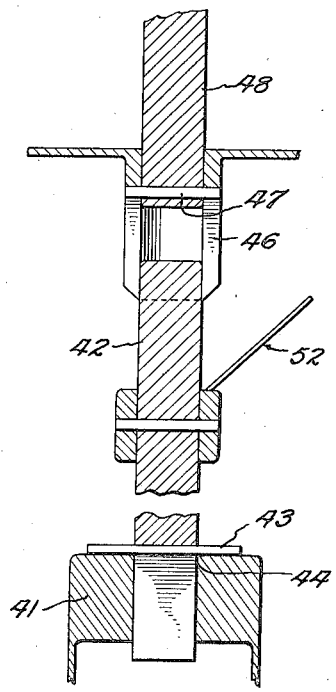
Inventor
George H. Tay
By Mason Fenwick & Lawrence
            Attorneys Patented Jan. 14, 1936

2,027,756

UNITED STATES PATENT OFFICE 2,027,756

CENTER LINE SCRAPER AGITATOR

George H. Tay, Philipsburg, Pa., assignor to Lee Metal Products Company, Inc., Philipsburg, Pa.

Application December 20, 1934, Serial No. 758,496

11 Claims. (Cl. 259—43)

This invention relates generally to new and useful improvements in agitating devices; and more particularly to devices designed to revolve in and scrape the inside of jacketed cylindrical or spherical kettles or tanks in which liquid or semi-liquid products are heated or cooled.

The main object of the invention is to provide a device of this character which performs a scraping operation in a plane passing through the diameter of the kettle or tank, in order to ensure complete scraping of the center of the tank.

Another object of the invention is to provide a device of this character with scraping paddles formed of wood or other suitable non-metallic material, in order to avoid cutting or scratching of the inner surface of the kettle or tank.

A further object is to provide a device of this character with scraper paddles so constructed and mounted as to be held normally by their own weight in inclined scraping position, whether they be located in or out of operative position relative to the kettle or tank.

Still another object of the invention resides in the mounting of the scraper-agitating mechanism whereby the scraper and agitating parts of the apparatus may be raised bodily above the upper level of the kettle in order to provide for cleaning of the mechanism, or to permit the use of the kettle for products not requiring agitation.

Other objects of the invention will be disclosed as the detailed description thereof proceeds.

In the drawings:

Figure 2 is a horizontal section taken on the line 2—2 of Figure 1;

Figure 3 is a fragmentary side elevation to an enlarged scale of one of the scraper paddles forming part of the present invention;

Figure 4 is a plan of the paddle shown in Figure 3;

Figure 5 is a vertical transverse section to an enlarged scale of a bearing movable with the scraper mechanism into and out of the kettle, and forming a lower bearing for the operating shaft of the apparatus;

Figure 6 is a fragmentary vertical section through a modified form of the device, parts of the agitating mechanism being shown in elevation;

Figure 7 is a fragmentary vertical section through parts of the agitating mechanism shown in Figure 6, the scale being enlarged;

Figure 8 is a fragmentary vertical section taken on the line 8—8 of Figure 7.

Referring to the drawings, in which similar parts are designated by like numerals:

Figure 1:
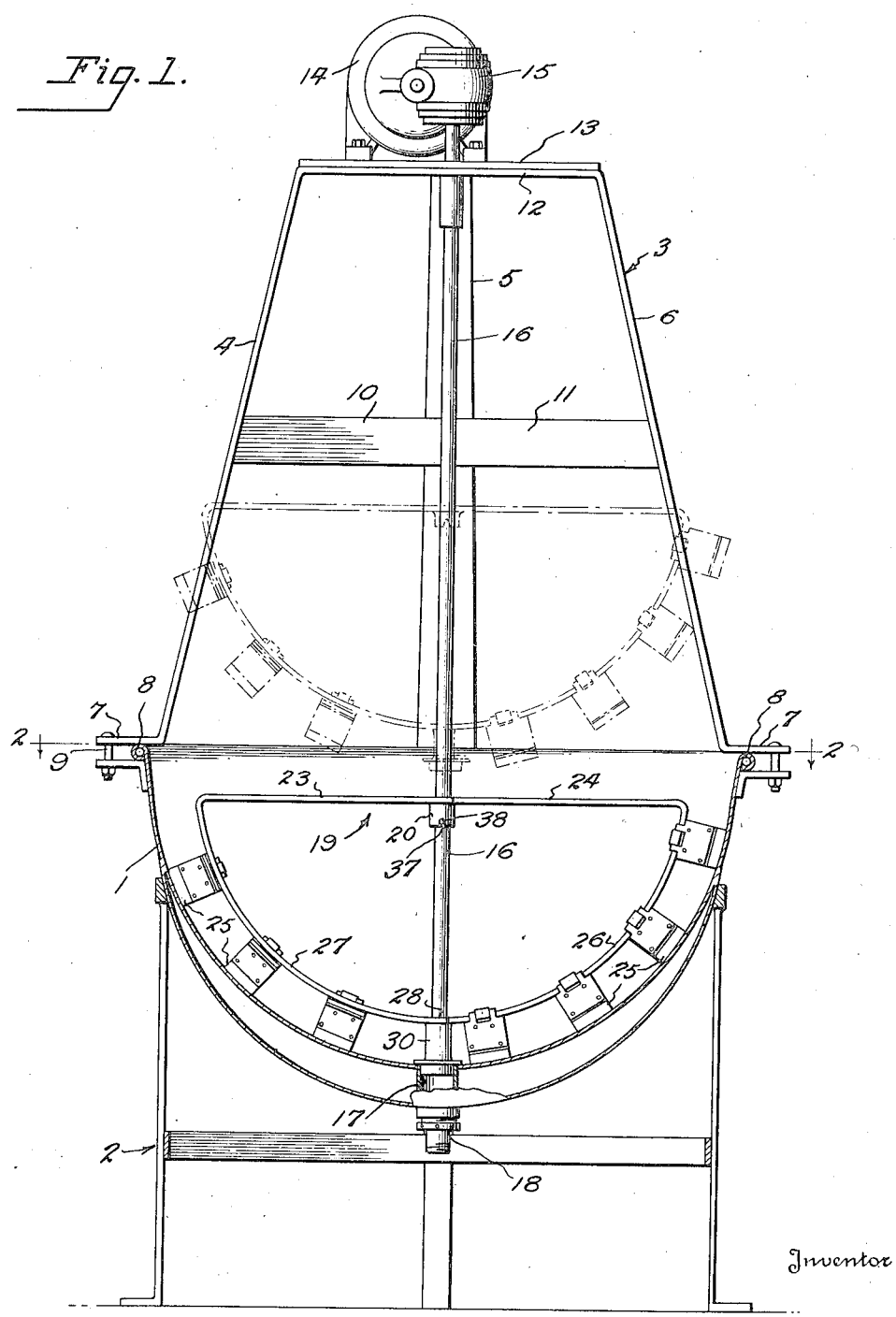
Figure 1 is a sectional elevation of the device, parts being broken away to show details of construction.

In the form of the invention shown in Figures 1 to 5 the apparatus comprises a jacketed kettle 1, hemi-spherical in cross section, supported upon a skeleton frame designated generally by the reference numeral 2. A spider frame designated generally by the reference numeral 3, and as shown in Figure 1, including three legs 4, 5, and 6, having their lower ends outturned to form flanges 7 resting upon the bead-like rim 8 of the kettle 1. Clamping brackets, shaped to fit under the rim 8, are secured by bolts 9 to the flanges 7 of the spider frame 3 and serve to hold this frame and kettle in operative relation to each other.

The legs 4, 5, and 6 are connected between their ends by braces 10 and 11; and the upper ends of these legs are connected to each other by a cross member 12 forming a support for a platform 13 on which a motor 14 is suitably mounted and secured. The motor 14 is connected through suitable reducing gearing 15 to a vertical shaft 16 which extends downwardly and axially into the kettle 1 and terminates at a short distance above the inner end of the outlet 17 at the bottom of the kettle 1. This outlet 17 is connected by piping 18 provided with any suitable valve mechanism to control the flow of material from the kettle.

Slidably mounted upon the shaft 16 is an agitator frame designated generally by the reference numeral 19. This frame comprises a sleeve 20 to which is fixedly secured the arms 21 and 22 extending diametrically across the sleeve. Arms 23 and 24 extend at right angles to the arms 21 and 22, and are spaced equidistantly from the axis of the sleeve 20. This distance between the arms 23 and 24 and the axis of the sleeve 20 or shaft 16 is the necessary distance for the location of the paddles 25 to enable the paddles to perform their scraper operation in planes passing through the axis of the shaft 16.

From the outer ends of the arms 23 and 24, depend the arcuate branches 26 and 27 of the frame 19. These branches, of course, conform to the shape of the inner surface of the kettle 1; and in Figure 2 lie directly below the arms 23 and 24, respectively. The branches 26 and 27 are connected to each other at the lower end by arms 28 and 29, lying directly below the arms 21 and 22. The arms 28 and 29 are also connected rigidly to a sleeve 30, which is expanded at its lower end to form a cylindrical extension 31 having its outer diameter equal to the inner diameter of the outlet 17. An annular flange 32 formed at the upper end of the extension 31 and on the sleeve 30 serves as a support for the lower end of the agitating and scraping frame during the operation of the latter.

Each of the paddles 25 is constructed as shown in detail in Figures 3 and 4 of the drawings; and comprises a hinge plate 26' provided with a slot 27' adapted to receive a knuckle 28' formed on one of the branches 27' or 26'. Apertured lugs 30' and 31' are formed on or suitably secured to the plate 26' on opposite sides of the slot 27'; and have their apertures registering with an aperture formed in the knuckle 28 to receive a pivot pin 32 which passes through said registering apertures.

The hinge plate 26' is bent near its upper end substantially as shown in Figure 3 of the drawings; and has parts thereof on opposite sides of the slot 27' extended beyond the hinge knuckle 28' to contact with the underside of the branch 27' in order to form a stop 33 for limiting the rotary movement of the plate 26' relative to the branch 27'. A wooden paddle 34 is clamped between the hinge plate 26' and a clamping plate 35 by means of bolts 36, which pass through registering apertures in the plates 26' and 35 and the paddle 34.

As will be apparent from Figure 2 of the drawings the paddles 25 are mounted on the branches 26 and 27 so that the edges of the paddles which contact with the inner surface of the kettle 1, all lie in a plane passing through a diameter of the kettle and through the axis of rotation of the shaft 16. The paddles 25 on the branch 26 are staggered with relation to the location of the paddles 25 on the branch 27. For example, the paddles on the branch 27 are spaced with respect to the axis of the shaft 16 so that during the revolution of the scraper-agitator the spaces between the paddles on the branch 26 will be scraped by the paddles on the branch 27. In Figures 1 and 2 there are four paddles shown on the branch 26; and three on the branch 27. The lowermost scraper on the branch 26 is arranged quite close to the shaft 16, while the lowermost scraper on the branch 27 is spaced sufficiently from the shaft 16 to scrape the material left on the kettle surface by the spacing between the two lower paddles on branch 26. In other words, the material which is not scraped by the paddles on the branch 26 will be scraped by the paddles on the branch 27, so that eventually all of the material on the surface of the kettle will be agitated and scraped during the continuous revolutions of the scraper-agitator.

As will be apparent from Figure 1 of the drawings the scraper frame 19 and the scraper mechanism mounted thereon is slidable vertically on the shaft 16. In order to impart rotation to the scraper mechanism, when in operative position in the kettle, the shaft 16 has a pin 37 secured thereto and adapted to seat in a notch 38 formed in the lower edge of the sleeve 20. Obviously, the scraper mechanism can be raised at any time along the shaft 16 and held by any suitable means connected to the framework for the purpose of cleansing or repairing the same.

The bearing arrangement for the shaft 16 at the outlet 17 of the kettle is of very desirable construction in devices of this character. When the scraper mechanism is raised on the shaft 16 the outlet 17 is unobstructed and permits the ready flow of material from the kettle through the pipe 18. This permits construction of scraper mechanism independently of any kettle except for the provision of a bearing sleeve, similar to the bearing sleeve 30, and made to conform to the size of the outlet opening in the kettle to be supplied with the scraper. In other words, the scraper mechanism can be manufactured as an independent unit to be sold for use with kettles of standard construction and already in operation.

In the form of the invention illustrated in Figures 6, 7 and 8, the kettle 39 supported on a standard not shown, has its outlet 40 arranged below a spider 41 which forms a fixed support for a cylindrical rod 42. The rod 42 is slotted at its lower end to seat over a pin 43 which is fixed across an opening 44 formed in the top of the spider 41. The upper end of the rod 42 is received in a cylindrical member 45, corresponding to the sleeve 20 of the form of the invention shown in Figure 1. The member 45 is slotted; and the slot 46 thereof is adapted to receive a pin 47 fixed to the lower end of a shaft 48, which may be connected to a motor supported by framework (not shown) similar to the motor and framework illustrated in Figure 1. The scraper paddles and the framework supporting them in this form of the invention are the same in construction as the corresponding members shown in Figure 1 of the drawings, and are similarly operated.

In this form of the invention the rod 42 has sleeves 49 and 50 suitably secured thereto and spaced along the rod within the framework supporting the paddle scrapers. Beater members 51 and 52 are secured to the sleeves 49 and 50 and extend radially thereof to increase the agitation of material rotated in the kettle by the operation of the framework and paddles supported thereby.

It will be apparent from inspection of Figures 6, 7 and 8 of the drawings that the beaters 51 and 52 remain stationary within the rotating framework and thereby effect a more thorough mixing of the material being agitated in the kettle. Devices of this general character are known in the art in which beaters within a rotating framework are rotated in a direction opposite to that of the framework. While the form of the invention shown in Figure 6 may not be quite as efficient, from the mixing standpoint, as these known devices, it is much cheaper to manufacture and much more easily installed and removed from the machine whenever it becomes necessary to repair or replace them.

Numerous variations may doubtless be devised by persons skilled in the art without departing from the principles of my invention. I, therefore, desire no limitations to be imposed on my invention except such as are indicated in the appended claims.

What I claim is:

1. A vessel having an outlet in its bottom, a shaft extending into said vessel coaxially with said outlet and terminating a short distance above said outlet, means for rotating said shaft, and scraper mechanism slidable on and rotatable with said shaft and including means rotatable in said outlet and closing the same when the mechanism is in scraping position in said vessel.

2. A vessel having an outlet in its bottom, a shaft extending into said vessel coaxially with said outlet and terminating a short distance above said outlet, means for rotating said shaft, and scraper mechanism slidable on and rotatable with said shaft and including a sleeve slidable on said shaft into and out of rotatable engagement with said outlet to close the outlet when the mechanism is in scraping position in said vessel.

3. A hemispherical vessel having an outlet in the bottom thereof, a shaft extending into said vessel coaxially with said outlet and terminating a short distance above said outlet, means for rotating said shaft, a frame slidable on and rotatable with said shaft and shaped to conform to the shape of the inner surface of said vessel, a sleeve secured to said frame and rotatable in and closing said outlet when the frame is in operative position within said vessel, and scrapers secured to said frame on opposite sides of said shaft and adapted to contact with the inner surface of said vessel when the sleeve is seated in said outlet.

4. A vessel having an outlet in its bottom, a shaft extending into said vessel coaxially with said outlet and terminating a short distance above said outlet, means for rotating said shaft, and scraper mechanism slidable on said shaft and including means rotatable in said outlet and closing the same when the mechanism is in scraping position in said vessel, said mechanism and shaft being provided with a pin and slot connection to impart rotation to said mechanism only when the mechanism is in scraping position in said vessel.

5. A vessel having an outlet in its bottom, a shaft extending into said vessel coaxially with said outlet and terminating a short distance above said outlet, means for rotating said shaft, and scraper mechanism slidable on said shaft and including a sleeve slidable on said shaft into and out of rotatable engagement with said outlet to close the outlet when the mechanism is in scraping position in said vessel, said mechanism and shaft being provided with a pin and slot connection to impart rotation to said mechanism only when the mechanism is in scraping position in said vessel.

6. A hemispherical vessel having an outlet in the bottom thereof, a shaft extending into said vessel coaxially with said outlet and terminating a short distance above said outlet, means for rotating said shaft, a frame slidable on said shaft and shaped to conform to the shape of the inner surface of said vessel, a sleeve secured to said frame and rotatable in and closing said outlet when the frame is in operative position within said vessel, and scrapers secured to said frame on opposite sides of said shaft and adapted to contact with the inner surface of said vessel when the sleeve is seated in said outlet, said frame and shaft being provided with a pin and slot connection to impart rotation from said shaft to said frame only when the frame and scraper secured thereto are in operative position in said vessel.

7. A hemispherical vessel having an outlet in the bottom thereof, a shaft extending into said vessel coaxially with said outlet and terminating above the outlet, means for rotating the shaft, a frame slidable on said shaft and having arcuate branches on opposite sides of the shaft, and scrapers pivoted to and spaced apart along said branches to contact with the inner surface of the vessel when the frame is in a predetermined position therein, said shaft and frame having cooperative means to support and rotate the frame when in said position, the branches being offset on opposite sides of the shaft to maintain the contact edges of the scrapers in a plane including the axis of said shaft, a support coaxial with said shaft and outlet, blades extending radially from said support within said frame, a spider mounted in said vessel over said outlet, a rod having its lower end non-rotatably connected to said spider and having its upper end rotatably connected to said shaft, and blades extending radially from said rod within said frame.

8. A hemispherical vessel having an outlet in the bottom thereof, a shaft extending into said vessel coaxially with and terminating above the outlet, means for rotating the shaft, a frame slidable on and having arcuate branches on opposite sides of the shaft, scrapers pivoted to and spaced apart along said branches to contact with the inner surface of the vessel when the frame is in a predetermined position therein, the frame having a sleeve provided with a radial slot and the shaft having a pin cooperating with the slot to impart rotation to the frame only when the frame is in predetermined position in said vessel, said branches being offset relative to the shaft to maintain the contact edges of the scraper in a plane including the axis of the shaft, a spider mounted in said vessel over said outlet, a rod having its upper end rotatable in said sleeve and having its lower end detachably and non-rotatably connected to said spider, and blades extending radially from said rod within said frame.

9. A hemispherical vessel, a shaft extending axially into said vessel, means for rotating said shaft, a frame slidably connected to said shaft and having arcuate branches extending on opposite sides of said shaft, scrapers pivoted to said branches, said branches being offset relative to the shaft to maintain the contact edges of the scrapers in a plane including the axis of the shaft, and means for imparting the rotation of the shaft to said frame only when the frame is in a predetermined position in said vessel.

10. A hemispherical vessel, a shaft extending axially into said vessel, means for rotating said shaft, a frame slidably connected to said shaft and having arcuate branches extending on opposite sides of said shaft, scrapers pivoted to said branches, said branches being offset relative to the shaft to maintain the contact edges of the scrapers in a plane including the axis of the shaft, and means for imparting the rotation of the shaft to said frame only when the frame is in a predetermined position in said vessel, said scrapers being provided with means for holding them normally inclined to the vertical in all positions of the frame.

11. A hemispherical vessel, a shaft extending axially into said vessel, means for rotating said shaft, arcuate arms extending from said shaft within said vessel, scrapers spaced apart along and pivoted to said arcuate arms, said arms being offset relative to the shaft to maintain the contact edges of the scrapers in planes which include the axis of the shaft, the spacings of the scrapers on one arm being staggered relative to the spacings of the scrapers on the other arm.

GEORGE H. TAY.